United States Patent [19]
Bronson

[11] Patent Number: 5,850,793
[45] Date of Patent: Dec. 22, 1998

[54] HYDROCHANNEL TRI-HULL

[75] Inventor: Timothy M. Bronson, Englewood, Fla.

[73] Assignee: Tim Bronson, Englewood, Fla.

[21] Appl. No.: 678,962

[22] Filed: Jul. 12, 1996

[51] Int. Cl.⁶ ................................ B63B 1/20; B63B 1/38
[52] U.S. Cl. ........................ 114/67 A; 114/272; 114/289; 114/290
[58] Field of Search .................... 114/272–273, 288–290, 114/271, 67 A

[56] References Cited

U.S. PATENT DOCUMENTS

| | | | |
|---|---|---|---|
| 1,389,865 | 9/1921 | Fox | 114/272 |
| 3,223,066 | 12/1965 | Irving | 114/290 |
| 3,288,096 | 11/1966 | Swenson | 114/273 |
| 3,342,278 | 9/1967 | Cocksedge | 114/67 A |
| 3,702,598 | 11/1972 | Szptyman | 114/289 |
| 3,918,382 | 11/1975 | Austin | 114/273 |
| 3,952,678 | 4/1976 | Weston | 114/272 |
| 4,348,977 | 9/1982 | Okajima | 114/273 |
| 4,365,578 | 12/1982 | Schellhaas | 114/272 |

Primary Examiner—Sherman Basinger
Attorney, Agent, or Firm—Dorothy S. Morse; American Innovations, Inc.

[57] ABSTRACT

A tri-hull using air and water collectively channeled and controlled through its design to enhance speed and stability of the tri-hull as it moves forward through the water. Structural wings connecting the two outer hulls to the middle hull comprise operational flaps which direct air in a desired direction along with the flow of air into air intake channels, the air exiting into hydrochannels beneath each outer hull where the interaction of the exiting air on the water moving through each hydrochannel provides an equalization or an upward force to the rear of the tri-hull and a resulting equalization or a downward force to the bow of the tri-hull which enhances the stability of the tri-hull at high speeds. The tri-hull also has adjustable air flow relief valves for controlling the flow of air into hydrochannels and sub fins beneath each outer hull to provide traction during turns. Applications may include, but are not limited to, power boats designed to travel at high speeds, such as full-scale off-shore racing boats and reduced-scale remotely controlled model boats.

4 Claims, 2 Drawing Sheets

HYDROCHANNEL TRI-HULL

BACKGROUND—FIELD OF INVENTION

This invention relates to boat hulls, specifically to a tri-hull using air and water collectively channeled and controlled through its design to enhance speed and stability of the tri-hull as it moves forward through the water. Applications may include, but are not limited to, power boats designed to travel at high speeds, such as full-scale off-shore racing boats and reduced-scale remotely controlled model boats.

BACKGROUND—DESCRIPTION OF PRIOR ART

Stability of boat hull movement through water is sometimes compromised at high speeds. Flow of air and water over the structural features of a boat hull can become unstable, causing the bow of the boat hull to raise or lower drastically resulting in loss of control of the boat. The design of a boat can incorporate features which contribute to an equalization or a downward force being applied to the bow or stern of a boat so as to increase its stability during forward movement through the water.

One invention providing increased stability to boat hulls is disclosed in U.S. Pat. No. 5,404,830 to Ligozio (1995). The Ligozio boat hull is a finned hull with a deep V-shape. Retractable hydrofoil fins are positioned in pockets above the keel, with at least one pair of fins positioned near the stern. The combination of the deep V-shaped hull and continuously adjustable fins can be used on mono-hulls, as well as tri-hulls, to provide a low center of gravity that assures balance and stability at all times, but particularly when the fins are operating. The Ligozio boat hull also allows a boat to achieve higher speeds with a lesser power requirement. The present invention differs from the Ligozio invention by combining air flow through its air intakes along with the flow of water through hydrochannels in the bottom surfaces of its two outer hulls, to provide enhanced stability during high speed operation.

The invention disclosed in U.S. Pat. No. 5,267,883 to Gudmundsen (1993) is an example of an invention having a water jet propulsion system which provides downforce to its bow. A vacuum chamber, having an intake valve on the front of the boat and an opposing exit valve on the bottom of the boat hull, is used with a cyclic air pump to form a jet slug which when reaching the exit port propels the boat hull in a forward direction. The present invention is also distinguished from the Gudmundsen invention in that the present invention uses an air intake through the boat hull in combination with two hydrochannels formed in the bottom surface of its two outer hulls to cause an equalization or an upward force against the stern of the tri-hull, which results in an equalization or a downward force being applied to the bow of the tri-hull, particularly during high speed operation.

The invention in U.S. Pat. No. 3,762,355 to Raynes (1973) discloses a water craft with aerodynamic lift so that at higher speeds the water craft operates in a semi-flying condition within the ground effect zone close to the water's surface. The body of the Raynes water craft has a high lift airfoil sectional shape and four cruising skis to provide for planing support for a portion of the weight of the water craft when it is in a high speed cruising attitude. The present invention is distinguished from the Raynes invention since the aerodynamic lift to the stern of the present invention is provided by a combination of structural wings with operational flaps for directing of air in a desired direction and air exiting from the air intakes acting on the water moving through the hydrochannels beneath each of its outer hulls.

The prior art thought to be most closely related to the hydrochannels of the present invention is the invention disclosed in U.S. Pat. No. 5,476,061 to Ackerbloom (1995). The Ackerbloom power boat hull has an outer running surface and a central running surface flanking an inner running surface. The outer running surface forms a channel with concave curvature which extends from bow to stem. Pressure builds in the channel during turns to lock the Ackerbloom hull to the water throughout the turns. The Ackerbloom transom also has a deflector plate having a curved surface lifted out of the water during high speed operation which deflects water downward to force its bow into the water. Transom dimensions in the Ackerbloom invention vary for different lengths of boat hulls. The present invention is distinguished from the Ackerbloom invention as the present invention uses hydrochannels in the bottom surface of its two outer hulls. Also the hydrochannels of the present invention are used in combination with structural wings containing operational flaps for directing of air in a desired direction along with air exiting from air intakes to enhance the stability of the tri-hull by providing an equalization or an upward force to its stern and a resulting equalization or a downward force to its bow. It is not known to have a tri-hull boat having two outside hulls and a middle hull, structural wings connecting each outside hull to the middle hull forward of the mid-section of each hull, operational flaps on the structural wings for the directing of air in a desired direction, air intakes located rearward of each structural wing at the intersection of the middle hull to each of the outside hulls, sub fins downwardly depending from each of the outside hulls forward of the mid-section of each outside hull which define hydrochannels under each outer hull through which water passes as the tri-hull moves forward through the water to provide traction for turns and to prevent lateral drifting during forward movement of the tri-hull through the water, the tri-hull also having air flow relief valves to control the flow of air exiting from the air intake channel exit openings into the hydrochannels, all of which in combination result in an equalization or a downward force being applied to the bow of the tri-hull to enhance its stability at high speeds.

SUMMARY OF INVENTION—OBJECTS AND ADVANTAGES

It is the primary object of this invention to provide a boat hull that performs well in the water. It is also an object of this invention to provide a boat hull which uses a combination of the air and water moving through its design to provide stability for the boat hull as is moves forward in the water at high speeds. A further object of this invention is to provide a boat hull that may be used for full scale high speed off-shore racing power boats, as well as reduced-scale remotely controlled model boats. It is also an object of this invention to provide a boat hull that provides an equalization or a downward force to the front of the boat hull by causing the rear portion of the boat hull to be raised or lowered upon request. A further object of this invention is to provide a boat hull that has an adjustable means for controlling the amount of air exiting from the air intake channel exit openings into the hydrochannels in the bottom of the boat hull, helping to provide further control of the forces applied to the stern and bow.

As described herein and properly manufactured, the present invention would provide a boat hull which would perform well in the water, with adjustable means for increasing stability at high speeds provided through adjustable air flow relief valves positioned in communication with air intake channels which direct air through each outer hull. The present invention contemplates three hulls with structural wings connecting each outside hull to the middle hull forward of the mid-section of each hull. The forward openings of the air intake channels are located rearward of each structural wing at the intersection of the middle hull to each of the outside hulls, each structural wing being configured and positioned to direct air in a desired direction. The present invention also has hydrochannels under the mid-section and rear portion of each outer hull through which water can pass as the boat hull moves forward through the water. Air intakes also have exit openings through the bottom of each of the outer hulls, near to its stern, which opens into the hydrochannels. The hydrochannels create a controlled surface which is used by the air exiting from the air intake channels to create an equalization or an upward force on the stern and a resulting equalization or a downward force on the bow of the present invention to improve its stability at high speeds and offer to the boat hull a cushion of resistance with very little drag, if any, to enhance its overall speed. Sub fins, located near the front of the tri-hull provide traction for turning the boat hull and prevent lateral drifting during forward movement of the boat hull through the water. In combination, the air intake channels, the structural wings with operational flaps to direct air in a desired direction along with air flow into the air intake channels, and the hydrochannels beneath each outer hull help to equalize or upwardly raise the stern of the present invention as air exiting from the rear exit opening of the air intake channels, along with operational flaps on the structural wings applying an equalization or a downward force to the water in each hydrochannel, causes the bow of the present invention to be equalized or forced downward into the water as the tri-hull moves forward through the water, thus enhancing the stability of the tri-hull at high speeds. Air flow relief valves through the outer side of each of the outer hulls, near to the exit opening of each air intake, allow for control of the amount of air exiting from each air intake channel exit opening into the hydrochannels when there is no compromising of forces.

The description herein provides preferred embodiments of the present invention but should not be construed as limiting the scope of the hydrochannel tri-hull invention. For example, variations in the design or number of structural wings used, the number and type of relief valves used, the configuration of the sub fins, and the dimension of the air intake channels, other than those shown and described herein, may be incorporated into the present invention. Thus the scope of the present invention should be determined by the appended claims and their legal equivalents, rather than the examples given.

DETAILED DESCRIPTION OF PREFERRED EMBODIMENTS

Figure 1:
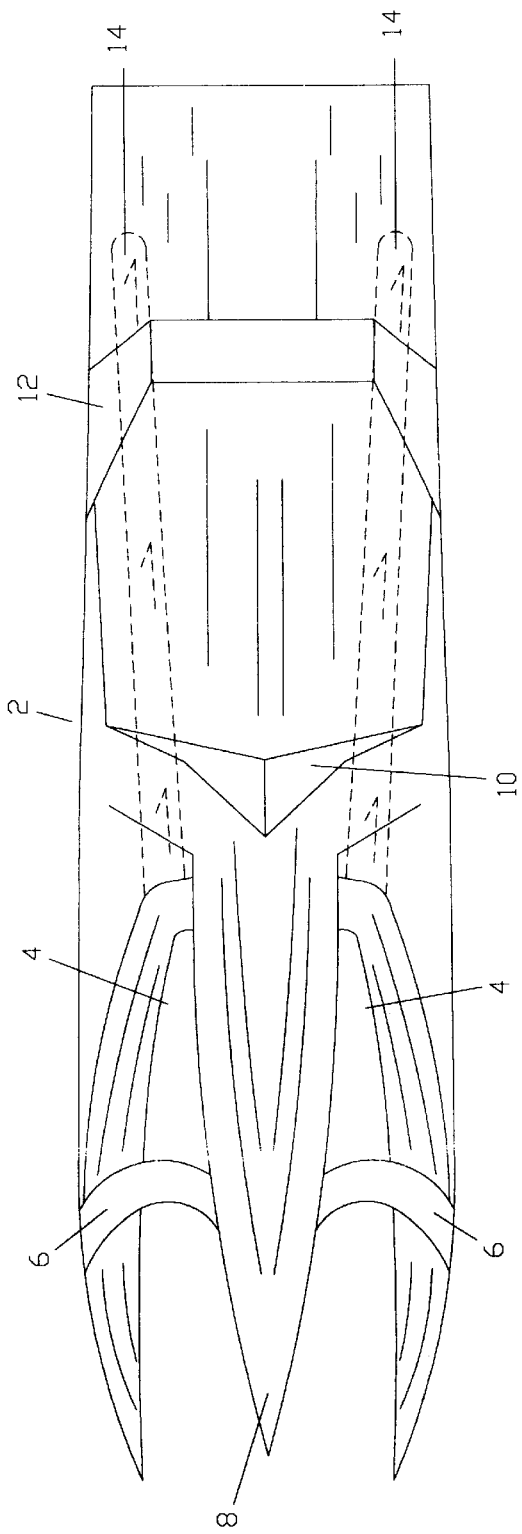
FIG. 1 is a top view of the invention having structural wings connected between forward portions of each outer hull to the middle hull.

FIG. 1 shows a preferred embodiment of a hydrochannel tri-hull invention 2 having a middle hull 8 and two outer hulls 24, the forward portion of each outer hull 24 being connected to middle hull 8 by a structural wing 6. The materials from which middle hull 8 and outer hulls 24 are made are not critical to hydrochannel tri-hull invention 2. In the preferred embodiment each outer hull 24 extends in a forward direction approximately equal with the bow of middle hull 8. FIG. 1 shows each structural wing 6 having a concave leading edge and a convex trailing edge. Although not shown, it is also contemplated in the preferred embodiment for structural wings 6 to have operational flaps to direct air in the desired direction along with the flow of air into air intake openings 4 at the intersection of each outer hull 24 with middle hull 8. In the preferred embodiment the design of structural wings 6 is not critical to hydrochannel tri-hull invention 2 as long as structural wings 6 are able to direct air in a desired direction along with the flow of air into air intake openings 4. Also, it is contemplated in the preferred embodiment to have more than one structural wing 6 connected between each outer hull 24 and middle hull 8. Air intake openings 4 lead air (not shown) into air intake channels 26 which direct the air through each outer hull 24 until it exits through the bottom of each outer hull 24 from one of two air exit openings 14. FIG. 1 also shows hydrochannel tri-hull invention 2 having a windshield 10 and a rear winged spoiler 12 attached to its upper surface rearward of air intake openings 4, rear winged spoiler 12 being positioned rearward of windshield 10. The dimension of each air intake channel 26 is not critical to hydrochannel tri-hull invention 2.

Figure 2:
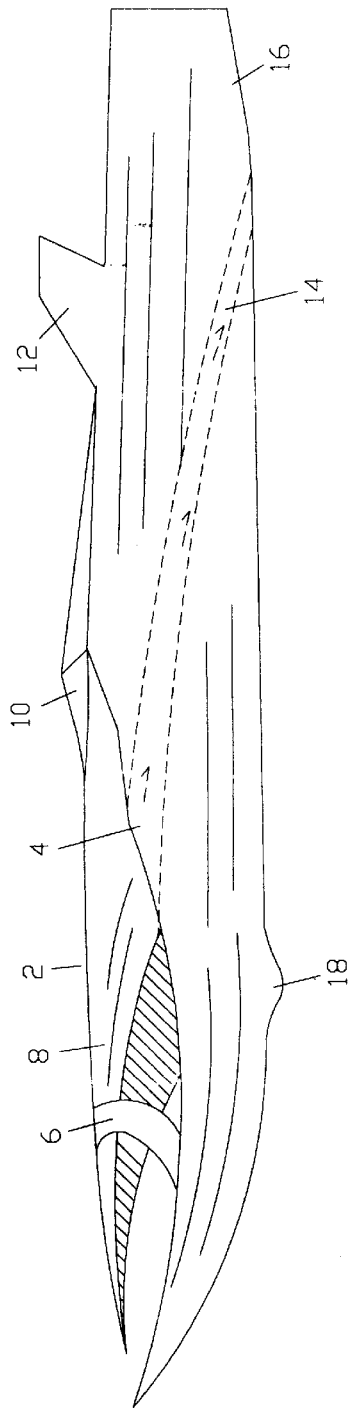
FIG. 2 is a side view of the invention having an air intake channel directing air through one of the outer hulls.

FIG. 2 shows hydrochannel tri-hull invention 2 having structural wing 6 connected between outer hull 24 and middle hull 8. Middle hull 8 has a slight downward curvature toward its leading edges, thus providing a surface upon which air (not shown) moving across the leading edges would contact and resulting in a small downward force on the bow of middle hull 8. FIG. 2 also shows hydrochannel tri-hull invention 2 having air intake opening 4 positioned rearward of structural wing 6, with air intake channel 26 angling downward through outer hull 24 so that the air exits from air exit opening 14 through the bottom of hydrochannel tri-hull invention 2. FIG. 2 shows a transom 16 positioned rearward of air exit opening 14. FIG. 2 also shows a sub fin 18 positioned on the bottom of outer hull 24 in a position slightly forward of air intake 4. Sub fins 18 provide traction during turning of hydrochannel tri-hull invention 2 and a means by which to prevent hydrochannel tri-hull invention 2 from moving laterally while in motion. FIG. 2 also shows windshield 10 and rear winged spoiler 12 attached to the upper surface of hydrochannel tri-hull invention 2 and a air flow relief valve 22 connected through the outside surface of outer hull 24 in a position for communication with air intake channel 26. The type of air flow relief valve 22 used is not critical to hydrochannel tri-hull invention 2. However, in the preferred embodiment it is contemplated for air flow relief valves 22 to be adjustable and for hydrochannel tri-hull invention 2 to have more than two air flow relief valves 22.

Figure 3:
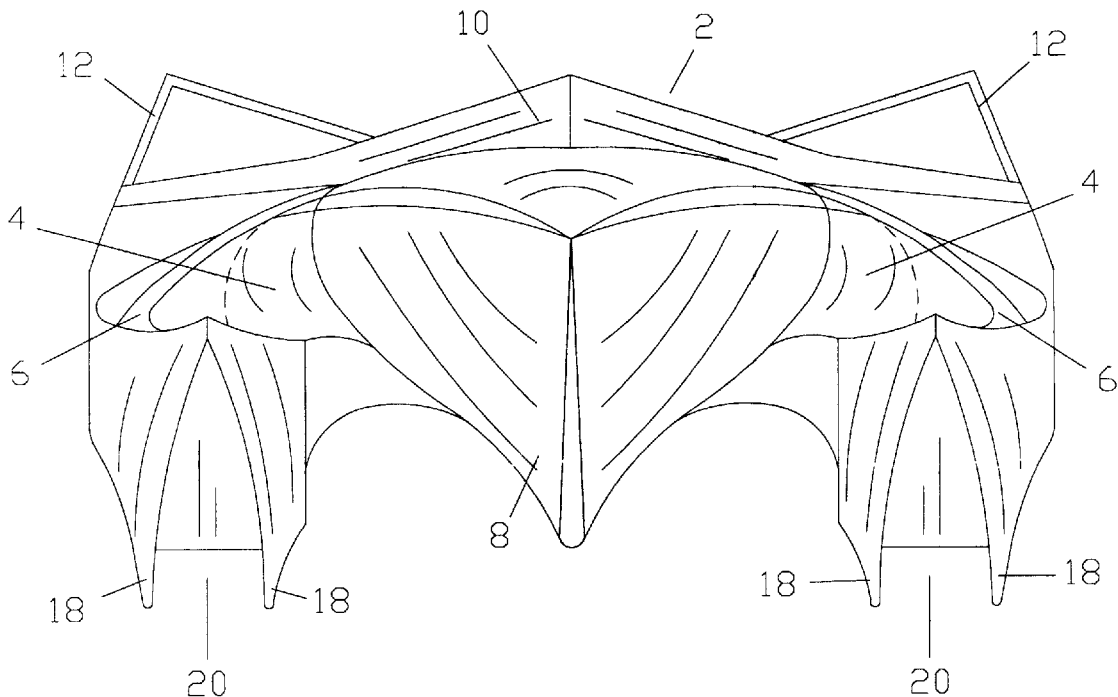
FIG. 3 is a front view of the invention having hydrochannels beneath each outer hull and air intake channels at each intersection of one of the outer hulls to the middle hull.

FIG. 3 shows hydrochannel tri-hull invention 2 having windshield 10 and rear winged spoiler 12 attached to the upper surface of hydrochannel tri-hull invention 2. FIG. 3 also shows structural wings 6 connected between middle hull 8 and each outer hull 24, with air intake openings 4 positioned at the intersection of middle hull 8 with each outer hull 24. In addition, FIG. 3 shows each outer hull 24 having two sub fins 18 with a hydrochannel 20 defined as the area between each pair of sub fins 18. In the preferred embodiment the configuration of sub fins 18 is not critical to hydrochannel tri-hull invention 2.

Figure 4:
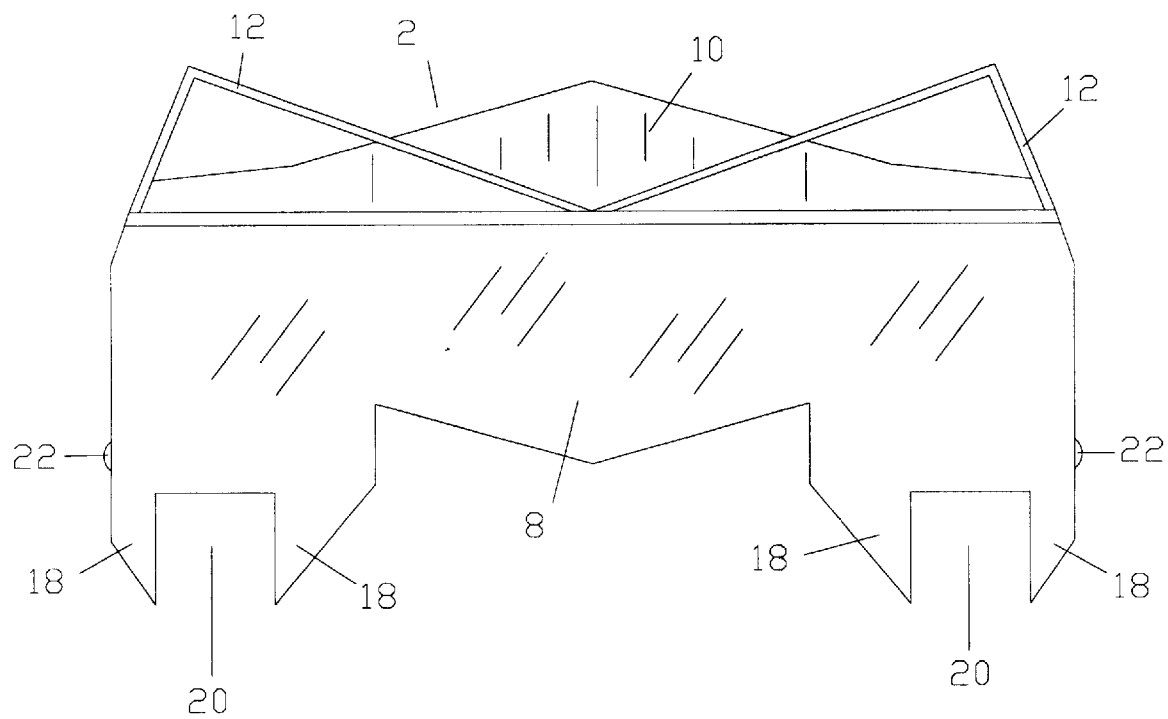
FIG. 4 is a back view of the invention having a windshield and a rear winged spoiler upwardly depending across the full width of the upper portions of the tri-hull.

FIG. 4 shows hydrochannel tri-hull invention 2 having windshield 10 and rear winged spoiler 12 attached to the upper surface of hydrochannel tri-hull invention 2. FIG. 4 also shows middle hull 8 positioned between two outer hulls 24 and each outer hull 24 having two sub fins 18 with hydrochannel 20 defined as the area between each pair of sub fins 18. In addition, FIG. 4 shows one air flow relief valve 22 positioned through the outside surface of each outer hull 24 in close proximity to each hydrochannel 20.

What is claimed is:

1. A tri-hull boat hull comprising two outer hulls each having a bottom surface and an outside surface; a middle hull having an upper surface, a bow, and a slight downward curvature on said upper surface toward said bow; said middle hull being positioned between said outer hulls and connected to said outer hulls thereby forming an intersection between said middle hull and each of said outer hulls, said middle hull and said outer hulls remaining connected rearward of said intersection to form a rear portion of said tri-hull; a plurality of structural wings, at least one of said structural wings connected between each of said outer hulls and said middle hull; one hydrochannel formed on said bottom surface of each of said outer hulls; two air intake channels each having an air intake opening and an air exit opening, each of said air intake openings located at one of said intersections of said middle hull to one of said outer hulls and having air flowing therethrough, each of said air exit openings communicating with one of said hydrochannels; at least two adjustable air flow relief valves, at least one of said air flow relief valves being connected through said outside surface of each of said outer hulls and being in communication with one of said air intake channels; and a pair of sub fins on said bottom of each of said outer hulls to provide traction for turning of said tri-hull so that, as said tri-hull moves forward, water moves through each of said hydrochannels, and air flows through one of said air intake channels and exits from said air exit openings to apply an equalization or a downward force upon said water in each of said hydrochannels and create an equalization or an upward force to said rear portion of said tri-hull with a resulting equalization or a downward force being applied to said bow.

2. The tri-hull of claim 1 further comprising a windshield connected to said rear portion of said tri-hull.

3. The tri-hull of claim 1 further comprising a rear winged spoiler connected to said rear portion of said tri-hull.

4. The tri-hull of claim 1 further comprising a windshield and a rear winged spoiler connected to said rear portion of said tri-hull.

\* \* \* \* \*